United States Patent
Xu et al.

(10) Patent No.: US 11,919,040 B2
(45) Date of Patent: Mar. 5, 2024

(54) CONTROL DEVICE AND CONTROL METHOD FOR REDUCING AND HOMOGENIZING WELDING RESIDUAL STRESS BY ACOUSTIC WAVE

(71) Applicant: BEIJING INSTITUTE OF TECHNOLOGY, Beijing (CN)

(72) Inventors: Chunguang Xu, Beijing (CN); Peng Yin, Beijing (CN); Yuren Lu, Beijing (CN); Shuangyi Li, Beijing (CN); Wenyuan Song, Beijing (CN)

(73) Assignee: BEIJING INSTITUTE OF TECHNOLOGY, Beijing (CN)

(*) Notice: Subject to any disclaimer, the term of this patent is extended or adjusted under 35 U.S.C. 154(b) by 297 days.

(21) Appl. No.: 17/364,071

(22) Filed: Jun. 30, 2021

(65) Prior Publication Data

US 2022/0032341 A1  Feb. 3, 2022

(30) Foreign Application Priority Data

Jul. 29, 2020 (CN) .......................... 202010745783.1

(51) Int. Cl.
*B06B 1/06* (2006.01)
*B06B 3/00* (2006.01)
*B23K 20/10* (2006.01)

(52) U.S. Cl.
CPC .............. *B06B 1/0622* (2013.01); *B06B 3/00* (2013.01); *B23K 20/10* (2013.01); *B06B 2201/72* (2013.01)

(58) Field of Classification Search
CPC .......... B06B 1/0622; B06B 3/00; B23K 20/10
See application file for complete search history.

(56) References Cited

U.S. PATENT DOCUMENTS 3,274,033 A * 9/1966 Jacke ....................... C21D 9/50
148/558

FOREIGN PATENT DOCUMENTS

| CN | H058329 A | 1/1993 |
|---|---|---|
| CN | 1557628 A | 12/2004 |
| CN | 103060545 A | 4/2013 |
| CN | 103343205 A | 10/2013 |
| CN | 203566075 U | 4/2014 |
| CN | 103866112 A | 6/2014 |
| CN | 104726687 A | 6/2015 |
| CN | 104802096 A | 7/2015 |

(Continued)

*Primary Examiner* — Scott R Kastler
(74) *Attorney, Agent, or Firm* — John A. Miller; Shumaker, Loop & Kendrick, LLP

(57) ABSTRACT

A control device for reducing and homogenizing welding residual stress by acoustic waves, comprising: a fixing tool having two rows of through holes; a plurality of ultrasonic transducers each having a body and a conical horn transmitting portion at a lower end of the body, wherein lower ends of the horn transmitting portions are fixedly connected with flanges, the horn transmitting portions of the ultrasonic transducers extend into respective through holes of the fixing tool to be in contact with welded parts below the fixing tool, the flanges are fixed to the fixing tool by bolts, and the two rows of through holes are arranged both sides of a welding seam of the welded parts; and a driving device for driving the ultrasonic transducers to operate. A corresponding control method is also provided. The control device can be used to control residual stress at the welding seam of steels.

5 Claims, 3 Drawing Sheets

(56) References Cited

FOREIGN PATENT DOCUMENTS

| | | | | |
|---|---|---|---|---|
| CN | 104959402 A | | 7/2015 | |
| CN | 105728930 A | | 7/2016 | |
| CN | 106282591 A | | 1/2017 | |
| CN | 107460421 A | | 12/2017 | |
| CN | 108660309 A | | 10/2018 | |
| CN | 110157894 A | | 8/2019 | |
| CN | 209652385 U | | 11/2019 | |
| CN | 209873179 U | * | 12/2019 | |
| RU | 2010145491 A | | 5/2012 | |
| WO | WO-2014110864 A1 | * | 7/2014 | ............. C21D 10/00 |

* cited by examiner

Cross section A-A

Partial view B

CONTROL DEVICE AND CONTROL METHOD FOR REDUCING AND HOMOGENIZING WELDING RESIDUAL STRESS BY ACOUSTIC WAVE

CROSS-REFERENCE TO RELATED APPLICATIONS

This application claims priority to China Patent Application Serial No. 202010745783.1 filed Jul. 29, 2020, the entire disclosure of which is herein incorporated by reference.

BACKGROUND

Field

The present disclosure relates to the technical field of residual stress control, and in particular to control device and method for reducing and homogenizing welding residual stress by acoustic wave.

Discussion of the Related Art

When two steel welded parts, especially two thicker steel welded parts such as doors and windows, are welded, stress is inevitably generated at the welding seam of the two welded parts welded together after welding, so that the welding seam becomes a position where the stress will change suddenly, which affects firm welding of the two welded parts in the future.

How to eliminate the residual stress at the welding seam during welding is a technical problem to be solved.

SUMMARY

In view of this, a main object of the present disclosure is to provide control device and control method for reducing and homogenizing welding residual stress by acoustic wave, so as to reduce residual stress at a welding seam of steels.

The present disclosure provides a control device for reducing and homogenizing welding residual stress by acoustic wave, which controls welding residual stress generated in welded parts during welding, the control device comprises:

a fixing tool having two rows of through holes;
a plurality of ultrasonic transducers each having a body and a conical horn transmitting portion at a lower end of the body, wherein lower ends of the horn transmitting portions are fixedly connected with flanges; and
a driving device for driving the ultrasonic transducers to operate,
wherein the horn transmitting portions of the ultrasonic transducers extend respectively into respective through holes of the fixing tool to be in contact with the welded parts below the fixing tool, the flanges are fixed to the fixing tool by bolts, and the two rows of through holes are arranged on both sides of a welding seam of the welded parts.

From the above, by designing the plurality of ultrasonic transducers and the horn transmitting portions connected with the ultrasonic transducers, when steels are welded, a plurality of horn transmitting portions are uniformly arranged on both sides of a welding seam of the welded parts, front end surfaces of the transmitting portions are in close contact with the welded parts, continuous ultrasonic waves are continuously input during welding by controlling the plurality of ultrasonic transducers, and are radiated into a molten pool. Mechanical vibrations of the ultrasonic waves are transmitted to the welding seam of the welded parts in the process from a molten state to solidification of a weld toe, so that a plastic deformation layer with enough depth is generated on the surface of the welding seam. Therefore, the appearance shape of the transition region between the welding seam and a base material is effectively improved with a smooth transition, the stress concentration degree at a welding position is reduced, and the metal near the welding seam is strengthened. At the same time, the ultrasonic waves are used to reduce a grain size, distribute solute uniformly, and reduce segregation, etc., so as to reduce the welding residual stress and improve the performance of the welding joint, thus ensuring firm welding of the two welded parts.

Wherein, the driving device comprises: a residual stress controller including an industrial computer, an analog-digital signal card and a multi-channel controller, which are connected in sequence by means of signals; a plurality of program-controlled power supplies which are separately connected by means of signals to respective channels of the multi-channel controller; and an adapter for outputting electrical signals of the plurality of program-controlled power supplies to the corresponding plurality of ultrasonic transducers; wherein, the residual stress controller, the plurality of program-controlled power supplies and the adapter are connected in sequence by means of signals.

From the above, different control modes for residual stress can be selected in accordance with different control requirements by designing the multi-channel controller and the plurality of program-controlled power supplies corresponding to the number of the ultrasonic transducers, so as to control each ultrasonic transducer in different modes.

Wherein, sleeves are disposed between the horn transmitting portions and the flanges, the horn transmitting portions are fixed to the sleeves by bolts, and the sleeves are fixedly connected to the flanges.

Wherein, spring are sleeved on the bolts for fixing the horn transmitting portions to the sleeves, and/or springs are sleeved on the bolts for fixing the flanges to the fixing tool.

From the above, the horn transmitting portions are fixed on the fixing tool by selecting the structure with the sleeves and the flanges. At the same time, the springs are provided on the bolts connecting the horn transmitting portions with the sleeves, or the springs are provided on the bolts connecting the flanges with the fixing tool. When the length of the springs is certain, the springs have a certain amount of pre-compression and a certain compression force. When the welded parts are pressed on the fixing tool, the welded parts compress the horn transmitting portions, which causes the flanges on the horn transmitting portions to compress the springs. Six or eight springs maintain the same elastic force, so as to keep close contact between the horn transmitting portions and the welded parts.

Wherein, an end surface of each of the horn transmitting portions in contact with the corresponding welded part is a matched curved surface when the welding seam is a curve and the corresponding welded part is a curved surface.

Wherein, the end surface of each of the horn transmitting portions in contact with the corresponding welded part is a matched curved surface along a regular curved surface when the welding seam is a three-dimensional space intersecting line.

Wherein, the horn transmitting portions are vertically attached to surfaces of the welded parts when the control device is applied to control residual stress in surfacing welding and ultra-wide welding seam welding areas.

From the above, in a practical application, the end surfaces of the horn transmitting portions in contact with the welded parts are determined according to the actual shape of the welding seam. Regardless of whether the welding seam is the curve or the three-dimensional space intersecting line, the end surfaces of the horn transmitting portions in contact with the welded parts are matched with the welding surfaces, and the horn transmitting portions is contacted with the surfaces of the welded parts by a vertical fitting method, so that ultrasonic waves are emitted vertically to the welded parts for minimizing the welding residual stress.

The disclosure also provides a control method for reducing and homogenizing welding residual stress by acoustic wave, which comprises:

setting the control device for reducing and homogenizing welding residual stress by acoustic wave, wherein two rows of horn transmitting portions corresponding to the two rows of through holes of the control device are arranged in a contact with both sides of a welding seam of welded parts, and contact positions are 10-15 mm away from a weld heat affected zone and are used as residual stress control positions during welding; and causing, during welding, the control device for reducing and homogenizing welding residual stress by acoustic wave to operate to perform residual stress control during welding.

From the above, the plurality of horn transmitting portions are uniformly arranged on both sides of the welding seam of the welded parts in the method, front end surfaces of the transmitting portions are in close contact with the welded parts. Moreover, the contact positions are 10-15 mm away from the weld heat affected zone, and then the plurality of ultrasonic transducers are controlled. Continuous ultrasonic waves are continuously input during welding to be radiated into a molten pool. In the process from a molten state to solidification of a weld toe, the ultrasonic waves are used to reduce a grain size, distribute a solute uniformly, reduce segregation, etc., so that the welding residual stress is reduced, the performance of the welding joint is improved, so as to ensure firm welding of two welded parts.

Wherein, the residual stress is first detected before it is controlled, and the control is then performed, and the residual stress is detected again after the control ends.

From the above, the residual stress is detected before it is controlled, and the residual stress controller is adjusted according to the detected residual stress. The ultrasonic transducer is driven to output a suitable central frequency by the controller, so as to control the residual stress during welding. Furthermore, the residual stress is detected again after the control is finished, so as to ensure the control effect.

DETAILED DESCRIPTION OF THE EMBODIMENTS

In order to make the objects, technical solutions and advantages of the present disclosure more apparent, the present disclosure will be described in further detail with reference to the examples shown in the accompanying drawings.

Welding residual stress of a thick plate steel structure is too large and will lead to deformation of the structure when it is greater than a yield strength of a material of the structure. The present disclosure can be applied to the welding process of thick plate steel structures, such as the welding process of steel doors and windows, to control residual stress and deformation of a welding seam.

Figure 1:
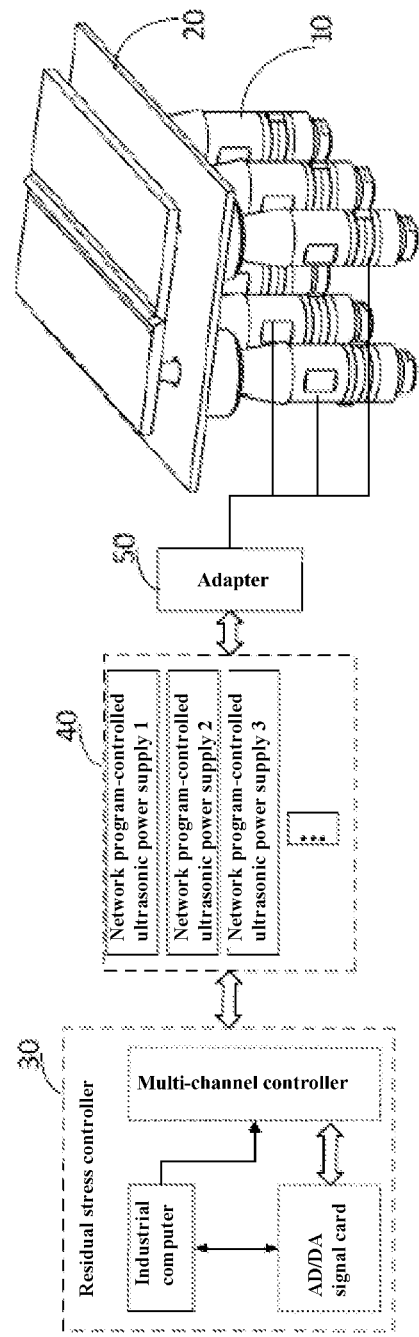
FIG. 1 is a schematic structural diagram of a control device for reducing and homogenizing welding residual stress by acoustic wave according to the present disclosure.

FIG. 1 shows a schematic structural diagram of a control device for reducing and homogenizing welding residual stress by acoustic wave according to an embodiment of the present disclosure.

The control device may include a fixing tool 20 having two rows of through holes thereon.

Figure 2:
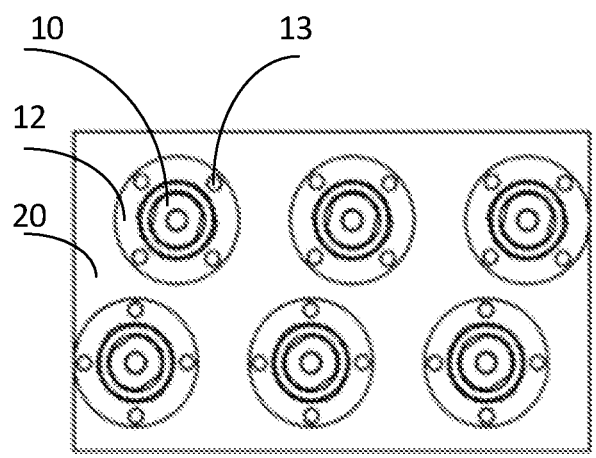
FIG. 2 is a top view of a schematic structural diagram of ultrasonic transducers assembled by a fixing tool.
Figure 3:
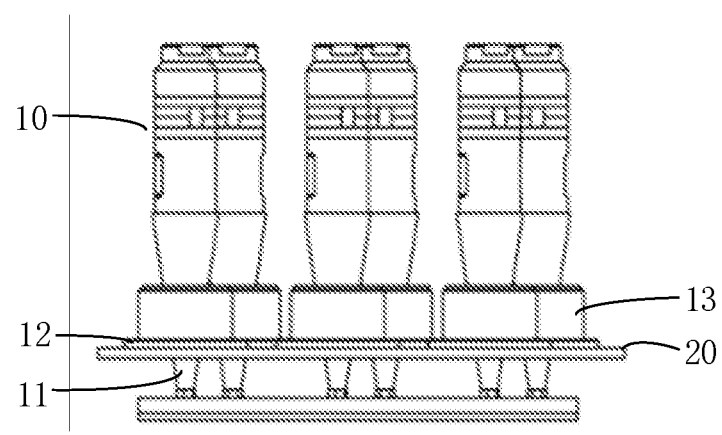
FIG. 3 is a side view of the schematic structural diagram of the ultrasonic transducers assembled by the fixing tool.

The control device may further include a plurality of ultrasonic transducers 10. A top view and a side view of a structural schematic diagram of the ultrasonic transducers assembled by means of the fixing tool are shown in FIGS. 2 and 3 respectively. Specifically, each ultrasonic transducer 10 has a body and a conical horn transmitting portion 11 at a lower end of the body. A lower end of each horn transmitting portion 11 is provided with a sleeve 13 and a flange 12, and in the embodiment of the disclosure, the sleeves 13 and the flanges 12 can form an integrated flange sleeve. Wherein, the plurality of ultrasonic transducers 10 can form an array control, so that a good residual stress control effect can be achieved under a long welding seam. The ultrasonic transducers 10 are ultrasonic wave generating devices for converting an electric signal into ultrasonic waves with the same frequency, and the horn transmitting portions 11 are acoustic wave amplitude amplification devices for amplifying the ultrasonic waves and transmitting them to welded parts contacted with the horn transmitting portions. A center frequency of each of the ultrasonic transducer 10s is generally 15 to 20 KHz, which can be selected according to specific situations.

The horn transmitting portions 11 of the ultrasonic transducer 10s extend respectively into the respective through holes of the fixing tool 20 to be in contact with the welded parts below the fixing tool 20. The horn transmitting portions 11 are fixed to the sleeves 13 by bolts, the flange plates 12 are fixed to the fixing tool 20 by bolts, and the two rows of through holes are arranged on both sides of a welding seam of the welded parts.

Figure 4:
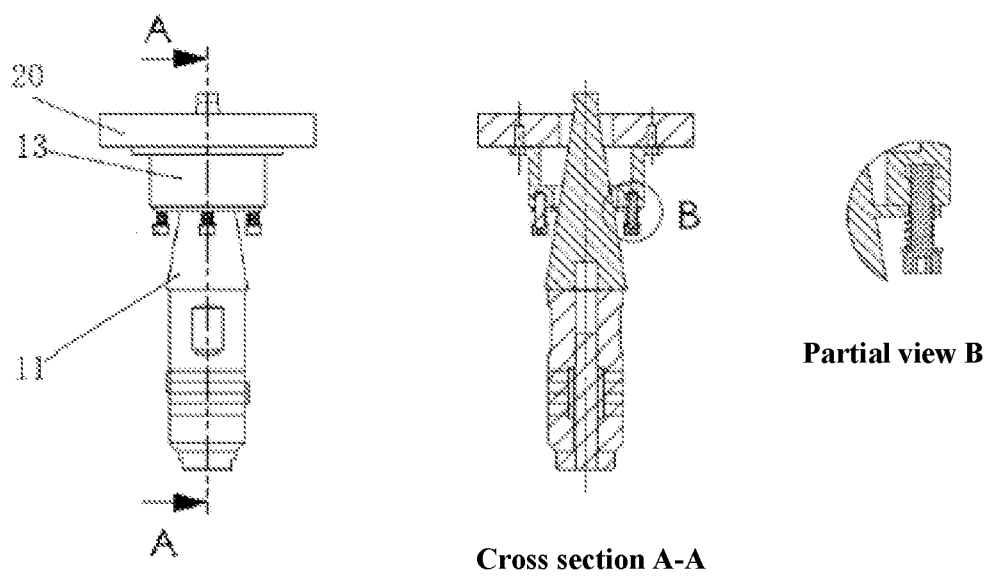
FIG. 4 is a cross-sectional view of the ultrasound transducer.

It can be seen from a cross section (the cross section A-A) of one of the ultrasonic transducers along the direction A-A and a bolt portion of the sleeve (partial view B) on the cross section in FIG. 4 that lower parts of threaded holes on the sleeves 13 are further provided with unthreaded holes that play the role of limiting the position when bolts are screwed into the threaded holes to press against bottom parts of the unthreaded holes. Screwing depths of the bolts are set to a uniform value. Meanwhile, the bolts fixing the horn transmitting portions 11 to the sleeves 13 are further sleeved with springs, and each of the springs has a certain amount of pre-compression and a certain compression force when the lengths of the springs are constant. When the welded parts are pressed on the tool, the welded parts compress the horn transmitting portions, which causes the flanges on the horn transmitting portions to compress the springs. Six or eight springs maintain a consistent elasticity, so as to keep close contact between the horn transmitting portions and the welded parts. In addition, the bolts fixing the flanges 12 to the tool 20 can be further sleeved with springs, which play the same role as the springs sleeved on the bolts fixing the horn transmitting portions 11 to the sleeves 13.

In the present disclosure, when all of the ultrasonic transducers are arranged in an array, the contact between the horn transmitting portions and the welded parts is not good due to insufficient flatness of the original surface of the welded parts or deformation of the welded parts caused by welding stress, etc. Therefore, each of the ultrasonic transducers can be an independent pressing unit by using the springs, to ensure that the horn transmitting portions are always tightly attached to the surfaces of the welded parts.

The ultrasonic transducers 10 are electrically connected to a driving device for driving the ultrasonic transducers 10 to operate.

Wherein, the driving device may include: a residual stress controller 30 including an industrial computer, an analog-digital (AD) signal card and a multi-channel controller that are connected in sequence by means of signals; a plurality of program-controlled power supplies 40 connected in a signal manner to respective channels of the multi-channel controller respectively and providing electrical signals with different frequencies under the control of the industrial computer; and an adapter 50 for outputting the electrical signals of the plurality of program-controlled power supplies 40 to the corresponding plurality of ultrasonic transducers 10, to excite the plurality of ultrasonic transducers 10 to convert electrical energy into mechanical vibrations (ultra-acoustic waves) with the same frequency, which are amplified by the horn transmitting portions 11 and then emitted to the contacted welded parts, wherein the residual stress controller, the plurality of program-controlled power supplies and the adapter are connected in sequence by means of signals. By means of the driving device, different control modes of residual stress can be selected according to different control requirements, such as the level of vibration frequency, a fixed or variable frequency, etc.

Wherein, the horn transmitting portions are vertically placed on the surfaces of the controlled parts and the horn transmitting portions are tightly attached to the surfaces of the controlled parts, and the shapes of the horn transmitting portions can be matched with the surfaces of the controlled parts. For example, an end surface of each of the horn transmitting portions in contact with the corresponding welded part is a matched curved surface when the welding seam is a curve and the corresponding welded part is a curved surface, the end surface of each of the horn transmitting portions in contact with the corresponding welded part is a matched curved surface along a regular curved surface when the welding seam is a three-dimensional space intersecting line, and the horn transmitting portions are vertically attached to the surfaces of the welded parts when the device is applied to the control of residual stress in surfacing welding and ultra-wide welding seam welding areas.

By means of the above structure, the horn transmitting portions are closely attached to the surfaces of the controlled parts to transmit the ultrasonic vibrations to the controlled parts which act on the welding seam. Furthermore, the specific controlled positions and the number of ultrasonic transducers are determined in accordance with the size and shape of the welding seam.

An embodiment of the present disclosure also provides a control method for reducing and homogenizing welding residual stress by acoustic wave.

The method may include a step of setting the control device for reducing and homogenizing welding residual stress by acoustic wave, wherein the two rows of horn transmitting portions corresponding to the two rows of through holes of the control device are arranged in a contact with both sides of the welding seam of the welded parts, and contact positions are 10-15 mm away from a weld heat affected zone and are used as residual stress control positions during welding.

The method may further include a step of causing, during welding, the control device for reducing and homogenizing welding residual stress by acoustic wave to operate to perform residual stress control during welding Plate waves are generated in thick plates by the ultrasonic transducers, wherein the ultrasonic transducers are always activated during the welding process, and continuous ultrasonic waves are continuously input into the welded parts and are radiated into a molten pool. In the process from a molten state to solidification of a weld toe, the ultrasonic waves are utilized to reduce a grain size, distribute a solute uniformly, and reduce segregation, etc., so as to reduce the welding residual stress and improve the performance of a welding joint.

In addition, the residual stress can be detected first during the above stress control, and the working mode of the residual stress controller can be selected according to the detected residual stress. Then, the above control is performed, and the residual stress is detected again after the control ends. Through such repeated operations, welding deformation is controlled by controlling the welding residual stress, so as to improve the performance of the welding joint and ensure firm welding of the two welding parts.

The above descriptions are only used to explain the preferred embodiments of the present disclosure and are not intended to limit the present disclosure. Any modification, equivalent replacement, improvement, etc. made within the spirit and principle of the present disclosure shall be included within the protection scope of the present disclosure.

What is claimed is:

1. A control device for reducing and homogenizing welding residual stress by acoustic wave, which controls welding residual stress generated in welded parts during welding, the control device comprising:
   a fixing tool having two rows of through holes;
   a plurality of ultrasonic transducers each having a body and a conical horn transmitting portion at a lower end of the body, wherein lower ends of the horn transmitting portions are fixedly connected with flanges; and
   a driving device for driving the ultrasonic transducers to operate,
   wherein the horn transmitting portions of the ultrasonic transducers extend respectively into the respective through holes of the fixing tool to be in contact with the welded parts below the fixing tool, the flanges are fixed to the fixing tool by bolts, and the two rows of through holes are arranged both sides of a welding seam of the welded parts, and
   wherein sleeves are disposed between the horn transmitting portions and the flanges, the horn transmitting portions are fixed to the sleeves by bolts, and the sleeves are fixedly connected to the flanges.

2. The control device according to claim 1, wherein the driving device comprises:

a residual stress controller including an industrial computer, an analog-digital signal card and a multi-channel controller, which are connected in sequence by means of signals;
a plurality of program-controlled power supplies which are respectively connected by means of signals to respective channels of the multi-channel controller; and
an adapter for outputting electrical signals of the plurality of program-controlled power supplies to the corresponding plurality of ultrasonic transducers, wherein the residual stress controller, the plurality of program-controlled power supplies and the adapter are connected in sequence by means of signals.

3. The control device according to claim 1, wherein springs are sleeved on the bolts for fixing the horn transmitting portions to the sleeves, and/or springs are sleeved on the bolts for fixing the flanges to the fixing tool.

4. A control device for reducing and homogenizing welding residual stress by acoustic wave, which controls welding residual stress generated in welded parts during welding, the control device comprising:
a fixing tool having two rows of through holes;
a plurality of ultrasonic transducers each having a body and a conical horn transmitting portion at a lower end of the body, wherein lower ends of the horn transmitting portions are fixedly connected with flanges; and
a driving device for driving the ultrasonic transducers to operate,
wherein the horn transmitting portions of the ultrasonic transducers extend respectively into the respective through holes of the fixing tool to be in contact with the welded parts below the fixing tool, the flanges are fixed to the fixing tool by bolts, and the two rows of through holes are arranged both sides of a welding seam of the welded parts,
wherein sleeves are disposed between the horn transmitting portions and the flanges, the horn transmitting portions are fixed to the sleeves by bolts, and the sleeves are fixedly connected to the flanges, and
wherein an end surface of each of the horn transmitting portions in contact with the corresponding welded part is a matched curved surface when the welding seam is a curve and the corresponding welded part is a curved surface.

5. A control device for reducing and homogenizing welding residual stress by acoustic wave, which controls welding residual stress generated in welded parts during welding, the control device comprising:
a fixing tool having two rows of through holes;
a plurality of ultrasonic transducers each having a body and a conical horn transmitting portion at a lower end of the body, wherein lower ends of the horn transmitting portions are fixedly connected with flanges; and
a driving device for driving the ultrasonic transducers to operate,
wherein the horn transmitting portions of the ultrasonic transducers extend respectively into the respective through holes of the fixing tool to be in contact with the welded parts below the fixing tool, the flanges are fixed to the fixing tool by bolts, and the two rows of through holes are arranged both sides of a welding seam of the welded parts,
wherein sleeves are disposed between the horn transmitting portions and the flanges, the horn transmitting portions are fixed to the sleeves by bolts, and the sleeves are fixedly connected to the flanges, and
wherein the end surface of each of the horn transmitting portions in contact with the corresponding welded part is a matched curved surface along a regular curved surface when the welding seam is a three-dimensional space intersecting line.

* * * * *